H. F. GEORGE.
STEERING GEAR LOCK FOR AUTOMOBILES.
APPLICATION FILED SEPT. 4, 1919.
1,339,329.
Patented May 4, 1920.
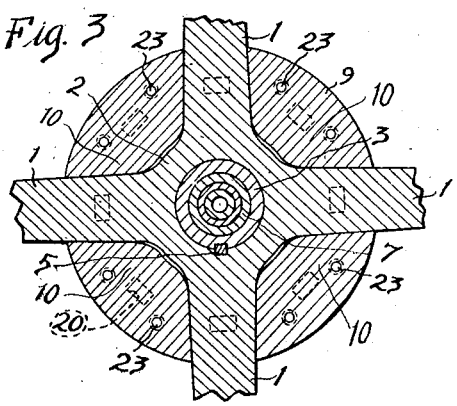
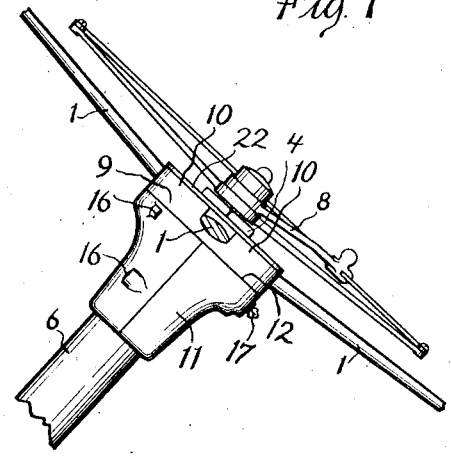
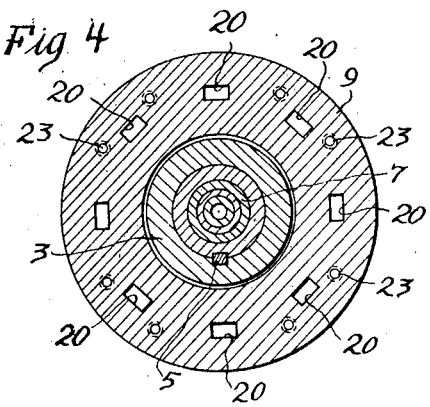
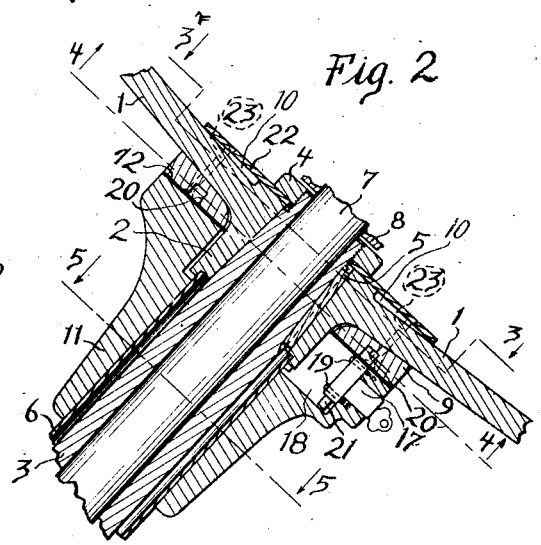
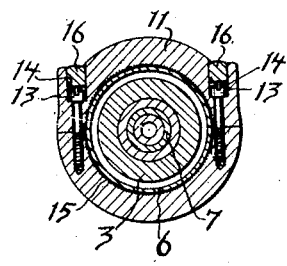
Inventor
Harry F. George,
By
Miehle & Miehle.
Atty's.

UNITED STATES PATENT OFFICE.

HARRY F. GEORGE, OF CHICAGO, ILLINOIS.

STEERING-GEAR LOCK FOR AUTOMOBILES.

1,339,329.　　　Specification of Letters Patent.　　Patented May 4, 1920.

Application filed September 4, 1919. Serial No. 321,621.

*To all whom it may concern:*

Be it known that I, HARRY F. GEORGE, a citizen of the United States, residing at Chicago, in the county of Cook and State of Illinois, have invented a certain new and useful Improvement in Steering-Gear Locks for Automobiles, of which the following is a specification.

My invention relates to steering gear locks for automobiles and has for one of its objects the provision of an efficient locking device which can be installed easily and without necessitating machine work on the steering gear or expensive substitution of parts thereof.

The above object and certain other objects hereinafter appearing are embodied in the preferred form of my invention hereinafter fully described and illustrated in the accompanying drawing and are effected by certain novel constructions, combinations and arrangement of parts particularly pointed out in the claims.

In the said drawings Figure 1 is a partial view in side elevation of a steering gear equipped with a lock embodying my invention.

Fig. 2 is an enlarged partial section of the same in similar elevation.

Fig. 3 is a sectional view in top plan elevation on the line 3—3 of Fig. 2.

Fig. 4 is a sectional view in bottom plan elevation on the line 4—4 of Fig. 2.

Fig. 5 is a sectional view in top plan elevation on the line 5—5 of Fig. 2.

Like characters of reference indicate like parts in the various views.

In the drawing 1 designates the spokes of the wheel of a conventional steering gear, which extend radially from the hub 2. See Fig. 2. The hub is provided with a tapered bore which is maintained in intimate contact with the upper tapered end of the rotatably mounted shaft 3 by means of a nut 4 screw threaded upon the extreme upper end of the shaft 3 and engaging the upper surface of the hub 2. The shaft 3 and hub 2 are fixed rotatively by means of a key 5 engaging corresponding slots in the hub and shaft. The lower end of the shaft 3 actuates the gearing, not shown, of the steering mechanism and through it controls the position of the steering wheels of the automobile. As is usual a stationary column 6 surrounds the shaft 3 below the hub 2 and has its upper end journaled in an enlargement of the bore of the hub 2, and as is also usual the shaft 2 is hollow to accommodate the shafts 7 of the spark and throttle control device 8.

The lock of my invention is designed for installation upon a steering gear of this conventional design, and operates to rotatively fix the steering wheel with the stationary column 6, when desired, and will now be described. An element 9 is disposed below the spokes 1 of the wheel and is provided with a projection 10 extending upwardly therefrom and extending between spokes of the wheel to form a positive rotatory connection between the element and wheel. This element is preferably annular and when installed surrounds shaft 3 and hub 2, and has a number of these projections extending between respective spokes whereby a more secure rotative connection is established. See Fig. 3. A second element 11 is fixed to the stationary column 6 and has an upwardly facing transverse surface 12 engageable with the under surface of the annular element 9 to prevent downward movement thereof and to prevent the projections 10 from disengaging from the spokes of the wheel. The annular element 9 is preferably formed in one piece and, when formed in one piece, is installed by removing the spark and throttle control device 8 and the wheel. The element 11 is preferably bored and split longitudinally and is clamped upon the stationary column 6 by means of headed screws 13 passing through deeply countersunk holes 14, formed in one portion of this element and disposed transversely of the bore on opposite sides thereof, and screw threaded into the other portion of the element. The bore of the element 11 is serrated, as designated at 15, see Fig. 5, to positively fix the same upon the stationary column 6. After the bored element 11 is installed plugs 16 are driven into the countersunk apertures 14 above the heads of the screws 13 to prevent the same from being removed.

A locking device is provided which is adapted to be actuated to rotatively fix the annular element 9 and the bored element 11 and consequently the steering wheel and stationary column 6. This locking device includes a conventional key lock 17 mounted within an opening 18 of the bored element 11 by means of headed screws 19, and a recess 20, see Fig. 4, formed in the annular element 9. The lock 17 includes a slidably mounted bolt 21 which is adapted to be actuated to enter the recess 20. The lock is so disposed that the sliding bolt 21 may be actuated to extend across the adjacent surfaces of the annular element 9 and bored element 11, whereby the sliding bolt is in a protected position. The recess is accordingly formed on the under surface of annular element 9 to be engaged by the sliding bolt. The annular element 9 is preferably provided with a number of recesses 20 arranged around the same and adapted to be separately entered by the sliding bolt with the steering wheel in any one of a number of positions.

In order that the annular element 9 may be maintained in a position coaxial with the wheel without necessitating the same and projections 10 fitting the spokes 1 closely, a second annular element 22 is provided which is disposed above the wheel and is secured to the projections 10 of the annular element 9 by rivets 23 passing through corresponding holes in the annular elements 9 and 22. The under surface of the element 22 lies upon the upper surface of hub 2 and is clamped thereon by the nut 4.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. A device of the character described including an element adapted to be disposed below spokes of the steering wheel of a steering gear, a projection on said element extending upwardly therefrom and adapted to extend between spokes of the wheel to form a positive rotatory connection between the wheel and element, a second element adapted to be fixed to the stationary column of the steering gear and having an upwardly facing transverse surface engageable with the under surface of said first mentioned element to prevent downward movement thereof and to prevent said projection from disengaging from the spokes of the wheel, and having a locking device adapted to be actuated to rotatively fix said first and second mentioned elements.

2. A device of the character described including an element adapted to be disposed below spokes of the steering wheel of a steering gear, a projection on said element extending upwardly therefrom and adapted to extend between spokes of the wheel to form a positive rotatory connection between the wheel and element, a second element adapted to be fixed to the stationary column of the steering gear and having an upwardly facing transverse surface engageable with the under surface of said first mentioned element to prevent downward movement thereof and to prevent said projection from disengaging from the spokes of the wheel, and a locking device including a bolt slidably mounted on one of said elements and adapted to be actuated to extend across the adjacent surfaces of said elements and a recess formed in the other element adapted to be entered by said bolt to rotatively fix said first and second elements.

3. A device of the character described including an annular element adapted to be disposed below the spokes of the steering wheel of a steering gear, a projection on said element extending upwardly therefrom and adapted to extend between spokes of the wheel to form a positive rotatory connection between the wheel and element, a second element adapted to be fixed to the stationary column of the steering gear and having an upwardly facing transverse surface engageable with the under surface of said annular element to prevent downward movement thereof and to prevent said projection from disengaging from the spokes of the wheel, and a locking device adapted to be actuated to rotatively fix said first and second mentioned elements.

4. A device of the character described including an annular element adapted to be disposed below the spokes of the steering wheel of a steering gear, a projection on said element extending upwardly therefrom and adapted to extend between spokes of the wheel to form a positive rotatory connection between the wheel and element, a second element adapted to be fixed to the stationary column of the steering gear and having an upwardly facing transverse surface engageable with the under surface of said annular element to prevent downward movement thereof and to prevent said projection from disengaging from the spokes of the wheel, and a locking device including a bolt slidably mounted on said second mentioned element and adapted to be actuated to extend across the adjacent surfaces of said elements and a series of recesses arranged around the annular element adapted to be separately entered by said bolt to rotatively fix said first and second elements with the wheel in any one of a number of positions.

5. A device of the character described including an annular element adapted to be disposed below the spokes of the steering wheel of a steering gear, a projection on said element extending upwardly therefrom and adapted to extend between the spokes of the wheel to form a positive rotatory connection between the wheel and element, a bored element adapted to be fixedly mounted by means of said bore upon the stationary column of the steering gear and having an upwardly facing transverse surface engageable with the under surface of said annular member, and a locking device adapted to be actuated to rotatively fix said first and second mentioned elements.

6. A device of the character described including an annular element adapted to be disposed below the spokes of the steering wheel of a steering gear, a projection on said element extending upwardly therefrom and adapted to extend between the spokes of the wheel to form a positive rotatory connection between the wheel and element, a bored element adapted to be fixedly mounted by means of said bore upon the stationary column of the steering gear and having an upwardly facing transverse surface engageable with the under surface of said annular member, and a locking device including a bolt slidably mounted in said bored element and adapted to be actuated to extend across the adjacent surfaces of said elements and a series of recesses arranged around the annular element and adapted to be separately entered by said bolt to rotatively fix said first and second mentioned elements with the wheel in any one of a number of positions.

7. A device of the character described including an element adapted to be disposed below spokes of the steering wheel of a steering gear, a projection on said element extending upwardly therefrom and adapted to extend between spokes of the wheel to form a positive rotatory connection between the wheel and element, a longitudinally split bored element having deeply countersunk apertures in one portion thereof disposed transversely to and on opposite sides of said bore, headed screws disposed within said bores and screw threaded into the other portion of the element to clamp the element upon the stationary column of the steering gear, plugs adapted to be driven into the countersunk apertures above the heads of the screws, said bored element having an upwardly facing transverse surface engageable with the under surface of said first mentioned element to prevent downward movement thereof and to prevent said projection from disengaging from the spokes of the wheel, and a locking device adapted to be actuated to rotatively fix said first and second mentioned elements.

8. A device of the character described including an annular element adapted to be disposed below the spokes of the steering wheel of a steering gear, projections on said element extending upwardly therefrom and adapted to extend between the spokes of the wheel to form a positive rotatory connection between the wheel and element, a second annular element disposed above the wheel, means securing said elements together, a third element adapted to be fixed to the stationary column of the steering gear and having an upwardly facing transverse surface engageable with the under surface of said first mentioned element to prevent downward movement thereof and to prevent said projections from disengaging from the spokes of the wheel, and a locking device adapted to be actuated to rotatively fix said first and third mentioned elements.

In witness whereof I hereunto affix my signature this 28th day of August, A. D. 1919.

HARRY F. GEORGE.